(12) United States Patent
Fagundes

(10) Patent No.: US 8,811,598 B2
(45) Date of Patent: Aug. 19, 2014

(54) SCHEDULING AN AGENT BASED ON A CONTACT CENTER HISTORY

(75) Inventor: Luciano Godoy Fagundes, Sao Paulo (BR)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/365,007

(22) Filed: Feb. 2, 2012

(65) Prior Publication Data

US 2013/0202100 A1    Aug. 8, 2013

(51) Int. Cl.
*H04M 3/00*          (2006.01)
(52) U.S. Cl.
USPC .................................. 379/266.08; 379/265.1
(58) Field of Classification Search
USPC .............. 379/266.08, 266.07, 266.02, 266.03
See application file for complete search history.

(56) References Cited

U.S. PATENT DOCUMENTS

| | | | | |
|---|---|---|---|---|
| 5,436,965 | A * | 7/1995 | Grossman et al. | 379/266.08 |
| 6,141,328 | A * | 10/2000 | Nabkel et al. | 370/259 |
| 7,080,321 | B2 * | 7/2006 | Aleksander et al. | 715/708 |
| 7,873,157 | B1 * | 1/2011 | Sim | 379/266.08 |

* cited by examiner

*Primary Examiner* — Amal Zenati

(57) ABSTRACT

When a customer communicates with a contact center, a history of the communication is stored. The communication from the customer can be in various media, such as a voice call, a video call, an email, an Instant Message (IM), a text message, and/or a blog posting. The history includes a context such as a reason for the communication and a time of the communication. The history of the communication is used to determine a pattern of the communication based on the context. Using the pattern, a time that the customer will communicate with the contact center is predicted. An agent associated with the customer is scheduled to be available at the predicted time. The predicted time can also be based on future events such as a product release or an event such as a political event, a sports event, and/or a convention.

22 Claims, 6 Drawing Sheets

SCHEDULING AN AGENT BASED ON A CONTACT CENTER HISTORY

TECHNICAL FIELD

The system and method relates to contact centers and in particular to scheduling agents in contact centers.

BACKGROUND

Traditional contact centers are designed to handle call loads based on times that customers will interact with the contact center. Based on projected loads, agents are scheduled to meet the projected loads. As the schedules for agents are defined, they do not necessarily correspond to when specific customers call the contact center. For example, when a customer calls in one time, the customer may get connected to an agent. The next time the customer calls in, the customer will likely get connected to a different agent. In many instances, the customer may be calling based on the same issue. Having to explain the same issue to different agents leads to lower customer satisfaction, thus resulting in the use of more contact center resources.

In cases where customers need access to a contact center on a regular basis, some contact centers provide a dedicated group of agents that support the customer. Although an improvement, in many cases the customer may still be dealing with different agents each time the customer tries to get support from the contact center. Still other contact centers provide a dedicated agent to support a particular customer. However, the customer may still call when the agent is not scheduled to work. What is needed is a system that allows an agent to be scheduled during times that the customer is likely to interact with the contact center.

SUMMARY

The system and method are directed to solving these and other problems and disadvantages of the prior art. When a customer communicates with a contact center, a history of the communication is stored. The communication from the customer can be in various media, such as a voice call, a video call, an email, an Instant Message (IM), a text message, and/or a blog posting. The history includes a context such as a reason for the communication and a time of the communication. The history of the communication is used to determine a pattern of the communication based on the context. Using the pattern, a time that the customer will communicate with the contact center is predicted. An agent associated with the customer is scheduled to be available at the predicted time. The predicted time can also be based on future events, such as a product release or an event, such as a political event, a sports event, and/or a convention.

A load on the associated agent can also be adjusted based on a predicted load on the contact center during the predicted time. This allows the associated agent to quickly handle communications from the customer.

As communications are received at the predicted time, the communication is routed to the associated agent. This can include notifying the customer that the communication is being routed to the associated agent.

If the communication from the customer is outside the predicted time, the customer can be notified of the predicted time. This allows the customer to call back into the contact center at the predicted time.

In another embodiment, upon reaching the predicted time, an out-bound communication can be established. The out-bound communication can be established after a defined time in the predicted time if the customer has not attempted to communicate with the contact center.

BRIEF DESCRIPTION OF THE DRAWINGS

In order to describe the manner in which other advantages and features of the disclosure can be obtained, a more particular description of the principles and the best mode briefly described below will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

In the appended Figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The following description and associated Figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
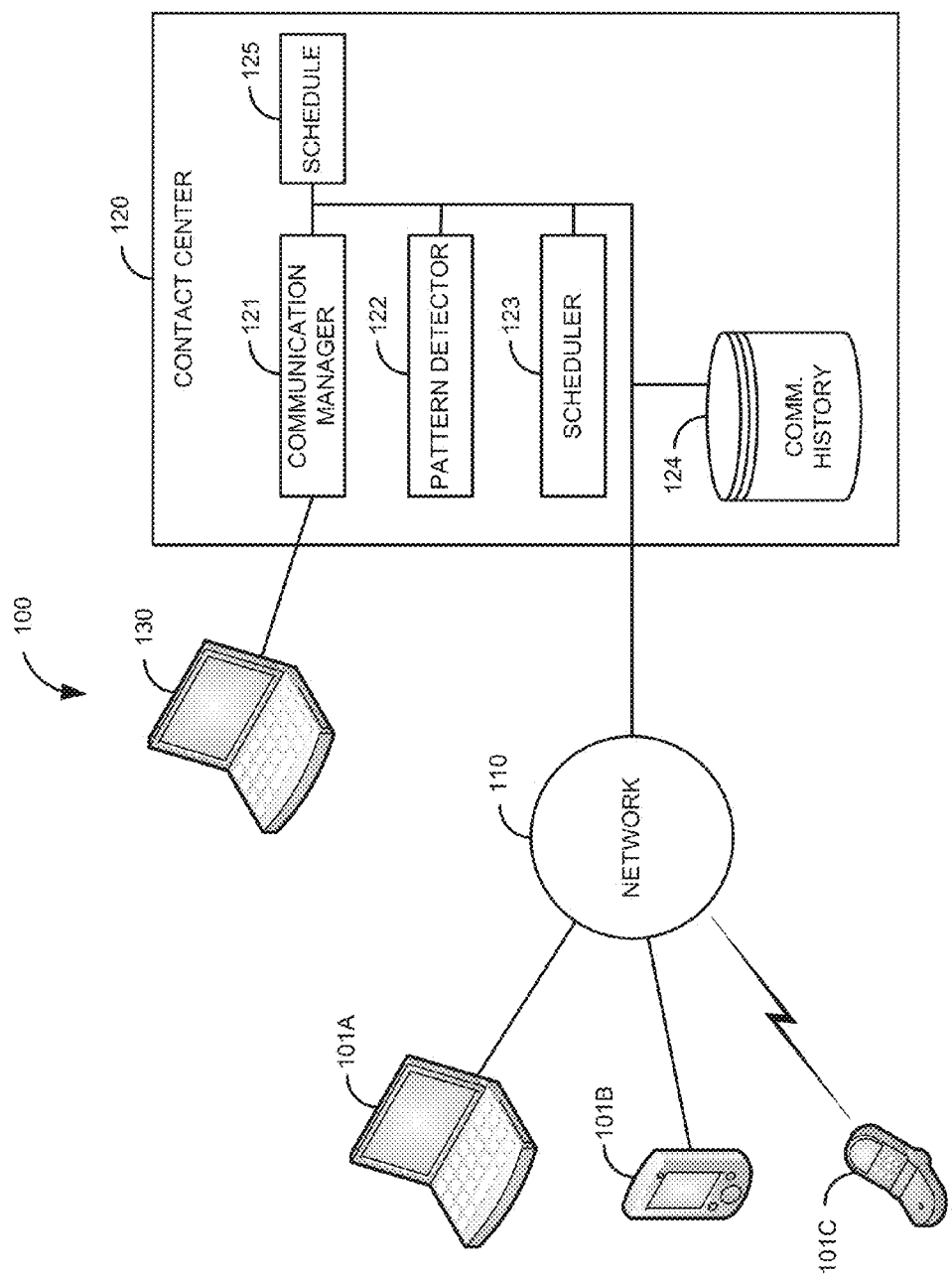
FIG. 1 is a block diagram of a first illustrative system for scheduling an agent.

FIG. 1 is a block diagram of a first illustrative system 100 for scheduling an associated agent. The first illustrative system 100 comprises communication devices 101A-101C, network 110, contact center 120, and agent terminal 130. Communication devices 101A-101C can be any type of device that can communicate with contact center 120, such as a Personal Computer (PC), a tablet computer, a cellular telephone, Personal Digital Assistant (PDA), a telephone, a video phone, a laptop computer, and the like. In this illustrative example, there are three communication devices 101A-101C. However, any number of communication devices 101 can be connected to network 110 to communicate with contact center 120.

Network 110 can be any type of network that can send and receive communications, such as the Internet, a Wide Area Network (WAN), a Local Area Network (LAN), the Public Switched Telephone Network (PSTN), a packet switched network, a circuit switched network, a cellular network, a combination of these, and the like. Network 120 can use a variety of protocols, such as Ethernet, Internet Protocol (IP), Session Initiation Protocol (SIP), Integrated Services Digital Network (ISDN), and the like.

Contact center 120 can be any type of contact center 120 that can answer communications from customers, such as a call center, a video call center, an email contact center, an Instant Message (IM) contact center, a social network contact center. Contact center 120 can handle various types of communications, such as voice communications, video communications, email communications, Instant Message (IM) communications, blog posts, and the like.

Contact center 120 further comprises communication manager 121, pattern detector 122, scheduler 123, communication history 124, and schedule 126. Communication manager 121 can be any hardware/software that can manage communications, such as an email system, an Instant Message (IM) system, a switch, a Private Branch Exchange (PBX), a router, a video switch, and the like. Pattern detector 122 can be any hardware/software that can detect patterns in communications. Scheduler 123 can be any hardware/software that can generate schedules, such as a calendaring system. Communication history 124 can comprise any type of communication information that can be stored in any type of a memory, such as a disk, a file system, a relational database, an object oriented database, a directory service, and the like. Schedule 125 comprises information about a schedule for an agent of contact center 120. Although each of the elements 121-125 of contact center 120 are shown in contact center 120, each element (121-125) may be implemented externally or internally to contact center 120.

Agent terminal 130 can be any type of device that can communicate with contact center 120, such as a Personal Computer (PC), a tablet computer, a cellular telephone, Personal Digital Assistant (PDA), a telephone, a video phone, a laptop computer, and the like. Although only a single agent terminal 130 is shown in FIG. 1, any number of agent terminals 130 can communicate with contact center 120. Agent terminal 130 may be connected to contact center 120 via network 110 or via other methods.

A customer at communication device 101 communicates with contact center 120. The customer can be an individual person, a group, a corporation, and the like. The communication from the customer could be a single communication, multiple communications over a period of time, multiple communications from multiple communication devices 101, and the like. The communication(s) could be in one or more mediums, such as voice communications, video communications, email communications, Instant Message communications, text messages, blog posts, and the like. Communication manager 121 stores the communication history in communication history 124. The communication(s) in communication history 124 also comprise a context. For example, the context can comprise a reason for the communication, a time of the communication (including a date), a medium of the communication, a product name, a product type, and/or the like.

Communication manager 121 gets the history of the communication(s) from the customer via communication history 124. Alternatively, communication manager could get the history by receiving the history from a device (e.g., a device that stores the communication history 124) within network 110. Pattern detector 122 determines a pattern from the history of the communication(s) from the context. The pattern can be detected from a single communication or from multiple communications from the customer. Pattern detector 122 can detect the pattern from the history of the communications context in various ways. For example, pattern detector 122 can detect a pattern that the customer calls contact center 120 the day after a new release of a product. Other examples could include instances where the person always calls on a particular day of the week within a specific time period. For example customer Y calls contact center 120 every Thursday between 10:00 A.M. and 2:00 P.M. Other patterns that can be detected can be where the customer always calls on a specific day(s) of the year. Still other patterns could be where the customer is likely to call within a period of time that another person calls the contact center.

Scheduler 123 predicts a time that the customer will communicate with contact center 120 based on the pattern. For example, if a customer typically sends an email to contact center 120 every Wednesday between 8:00 P.M. and 10:00 P.M. scheduler 123 can predict that the customer will likely send an email the next Wednesday between 8:00 P.M. and 10:00 P.M. Scheduler 123 schedules an agent (in schedule 125) associated with the customer to be available at the predicted time. The predicted time can be a time period or a specific time. In this example, the associated agent would be scheduled to work on Wednesdays between 8:00 P.M. and 10:00 P.M. so that the associated agent will be able to respond to the customer's email via agent terminal 130. An agent can be associated with the customer in various ways, such as being assigned to handle any calls from the customer, being assigned to support a group (i.e., a company and not a specific individual from the company), based on a previous call history with the customer, and the like. Based on the pattern and the predicted time, the customer is much more likely to correspond with the same agent each time the customer initiates a communication with contact center 120.

Figure 2:
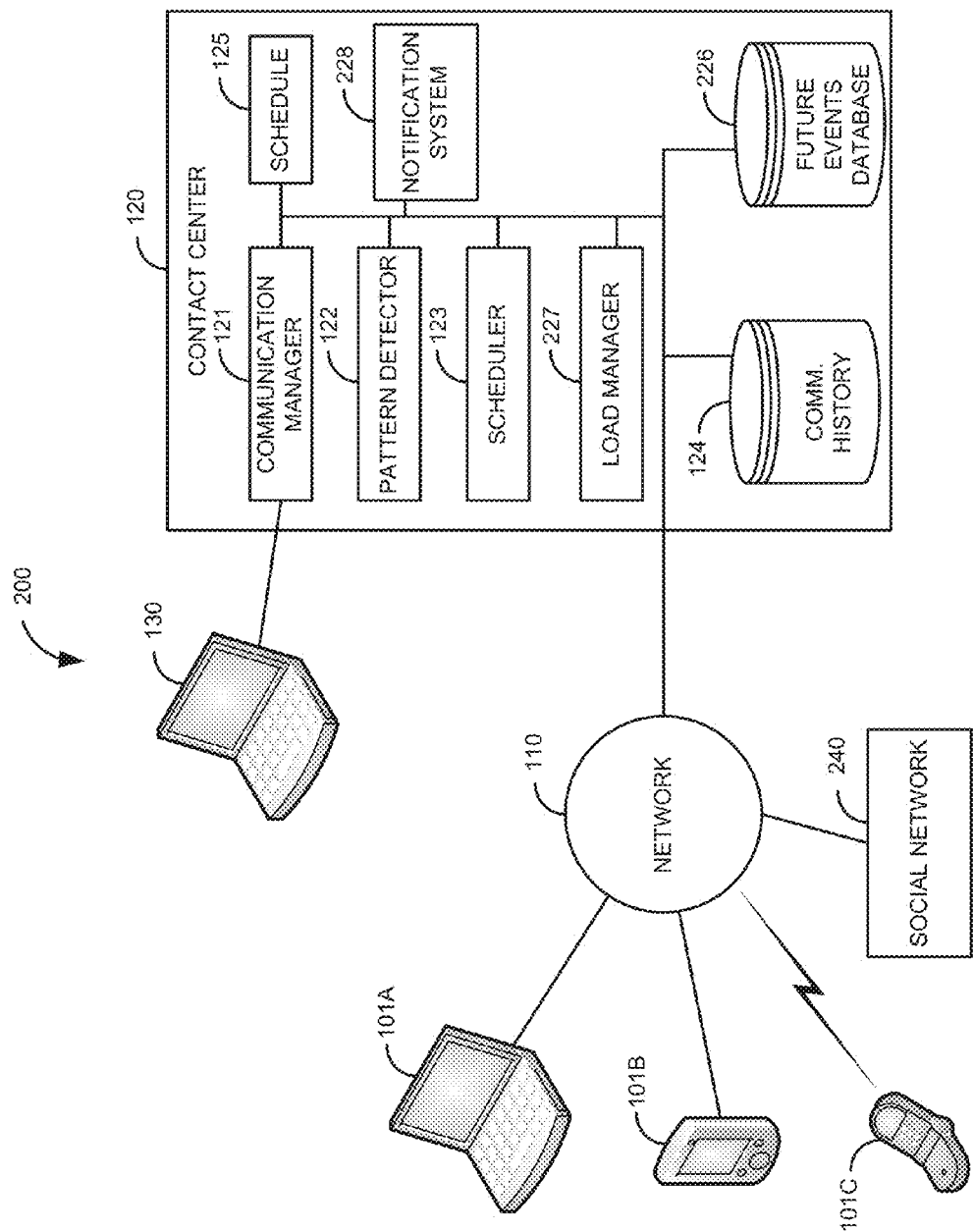
FIG. 2 is a block diagram of a second illustrative system for scheduling an associated agent.

FIG. 2 is a block diagram of a second illustrative system 200 for scheduling an associated agent. The second illustrative system 200 comprises communication devices 101A-101C, network 110, contact center 120, agent terminal 130, and social network 240. Contact center 120 comprises communication manager 121, pattern detector 122, scheduler 123, communication history 124, schedule 125, future events database 226, load manager 227, and notification system 228. Future events database 226 can be any storage medium that can store information, such as a database, a relational database, an object oriented database, a file, a directory service, a hard disk, a memory, and the like. Load manager 227 can be any hardware/software that can manage loads in contact center 120. Notification system 228 can be any hardware/software that can interact with a customer that calls into contact center 120. Notification system 228 can be an IVR system that can interact with customers via voice recognition, DTMF tones, and the like. Notification system 228 can be an email system, an Instant Message (IM) system, a text messaging system, a voice messaging system, a video system, and the like. Social network 240 can be any site where the customer can post information, such as a social network, a blog site, and the like. For example, social network 240 can be a social network, such as Facebook®, Twitter®, and the like.

A customer at communication device 101 communicates with contact center 120. The communication can be a communication via social network 240. For example, contact center 120 could monitor social network 240 for posts by the customer. The monitoring could be done automatically by crawling social network 240 with a web crawler (not shown), by being notified by social network 240, by an agent monitoring social network 240, and the like. Communication manager 121 stores the communication history of the communication in communication history 124. The communication(s) in communication history 124 also comprise a context such as the time of the communication and a reason for the communication. Communication manager 121 gets the history of the communication(s) from the customer via communication history 124. Pattern detector 122 determines a pattern from the history of the communication(s) based on the context.

A pattern can be determined from a pattern of postings on a social network 240 in relation to the history of the one or more communications from the customer. For example, if a customer of a travel agent called contact center 120 and scheduled trips in February 2010, June 2010, and May 2011, it may be difficult to determine a pattern based on that information alone. However, if contact center 120 also determined that the customer tweeted on Twitter® that she was going to plan a trip one week before calling contact center 120 to arrange a trip (for each of the three trips), then a pattern can be determined. Based on the pattern, scheduler 123 could schedule the associated agent to be available one week after the customer tweets that she is going to plan a trip.

Scheduler 123 predicts a time that the customer will communicate with contact center 120 based on the pattern. Scheduler 123 schedules an agent (in schedule 125) associated with the customer to be available at the predicted time. Scheduler 123 can also predict the time that the customer will communicate with contact center 120 based on a schedule of future events. For example, if the pattern is that the customer calls into contact center 120 the next day after the product X is released, scheduler 123 will use information from future events database 226 to determine when the next release of product X will occur. Based on the information in future events database 226, scheduler 123 will schedule the associated agent on the day after the next release of product X. In addition to product releases, other types of future events can be stored in future events database 226. For instance, the future event can be a political event, a sports event, a convention, or any other type of event that can be associated with a customer communication.

Load manager 227 is used to manage the load of communications in contact center 120. As communications are received, load manager 227 balances the number of communications that each agent services. This can be done in various ways, such as using agent queues. Load manager 227 can determine a potential load on contact center 120. In addition, load manager 227 can determine a potential load on a specific agent based on a predicted load in contact center 120.

Load manager 227 determines a potential load on the associated agent based on a predicted load on contact center 120 at the predicted time. For example, load manager 227 can determine that the load in contact center 120 is typically heavy during the predicted time. Rather than scheduling the associated agent like other agents, load manager 227 can adjust the potential load on the associated agent at the predicted time. This can be done in various ways such as reducing the number of calls that the associated agent is servicing during the predicted time or automatically routing a call from the customer to the associated agent (e.g., by placing the customer at the top of a queue for the associated agent); this way the associated agent will be able to service a call from the customer more quickly than the associated agent would normally be able to service a call from the customer.

When the customer calls in during the predicted time, call center 120 can indicate that the call is being routed to the associated agent. For example, if the associated agent's name is John Smith and the customer makes an audio call, a notification can be provided to the customer via notification system 228 (e.g., an Interactive Voice Response (IVR) system) that indicates that customer will be connected to agent John Smith.

In yet other embodiments, upon reaching the predicted time, communication manager 121 can initiate a communication with the customer (i.e., an out-bound communication). This can be based on waiting for a defined time within the predicted time and then initiating the communication with the customer. For example, upon reaching the predicted time, communication manager 121 can wait for an hour before initiating a voice call from the associated agent to the customer.

Figure 3:
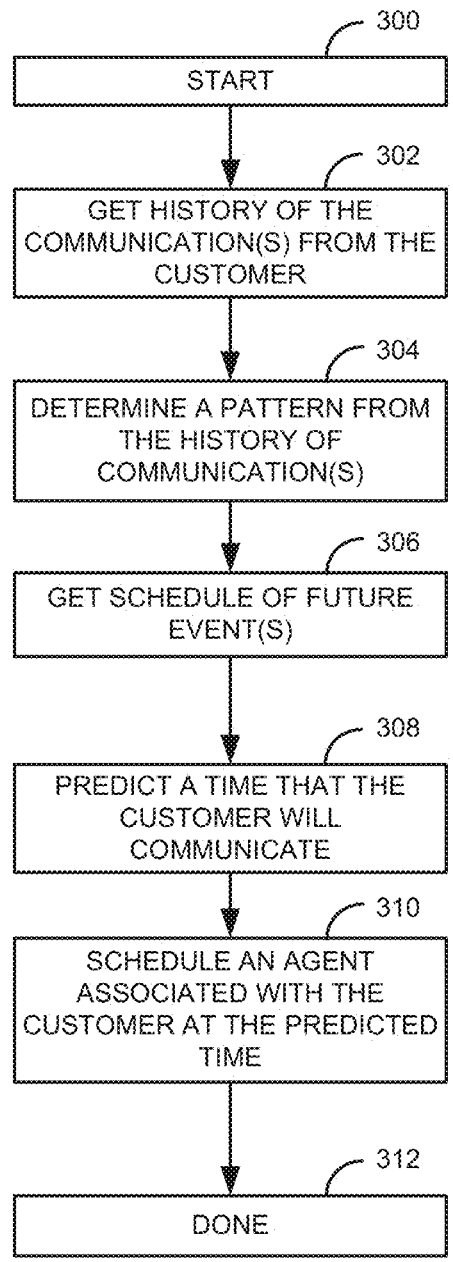
FIG. 3 is a flow diagram of a method for scheduling an associated agent.

FIG. 3 is a flow diagram of a method for scheduling an associated agent. Illustratively, communication device 101, network 110, contact center 120, communication manager 121, pattern detector 122, scheduler 123, load manager 227, notification system 228, and agent terminal 130 are stored-program-controlled entities, such as a computer or processor, which performs the method of FIGS. 3-6 and the processes described herein by executing program instructions stored in a tangible computer readable storage medium, such as a memory or disk.

The process starts in step 300. Communication manager 121 gets 302 the history of the communication(s) from the customer via communication history 124. The communication(s) also include a context. Pattern detector 122 determines 304 a pattern from the history of the communication(s) from the context. Scheduler 123 can optionally get 306 a schedule of future events. For example, if the context requires a schedule of future events (such as a future product release schedule) to predict a time that the customer will likely communicate, scheduler 123 gets 306 the schedule of future events from future events database 226.

Scheduler 123 predicts 308 a time that the customer will communicate with contact center 120. The predicted time can be based on a calling history of the customer, based on a calling history and a future event, and the like. Scheduler 123 schedules 310 an associated agent at the predicted time that the customer will communicate with contact center 120. The process is done in step 312.

Figure 4:
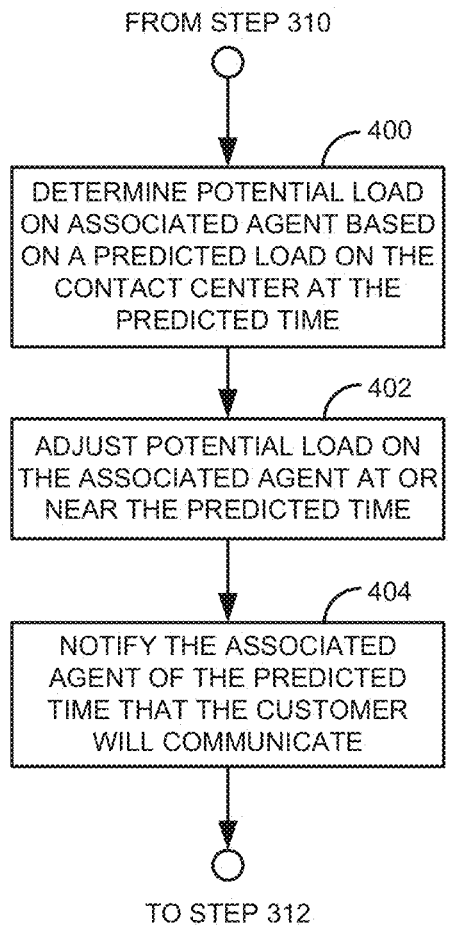
FIG. 4 is a flow diagram of a method for adjusting a potential load on an associated agent during the predicted time.

FIG. 4 is a flow diagram of a method for adjusting a potential load on an associated agent during the predicted time. The process in FIG. 4 goes between steps 310 and 312 in FIG. 3. Although this process is shown between step 310 and 312, one of skill in the art would recognize that the described process may be operable at different points in FIG. 3. In addition, various combinations of the features can be implemented in various embodiments. After the associated agent is scheduled at the predicted time in step 310, load manager 227 determines 400 a potential load on the associated agent based on a predicted load at the predicted time in contact center 120. Load manager 227 adjusts 402 the potential load on the associated agent at or near the predicted time. For example, load manager 227 can adjust the potential load at a time just prior to the predicted time to allow more time for the associated agent to handle the communication from the customer.

Notification system 228 notifies 404 the associated agent of the predicted time that the customer will communicate with contact center 120. The notification could be accomplished in various ways, such as via email, Instant Message (IM), and/or text message. Alternatively, the associated agent can be notified via schedule 125. Schedule 125 could be part of an email, an IM, a text message, and the like. The process then goes to step 312.

Figure 5:
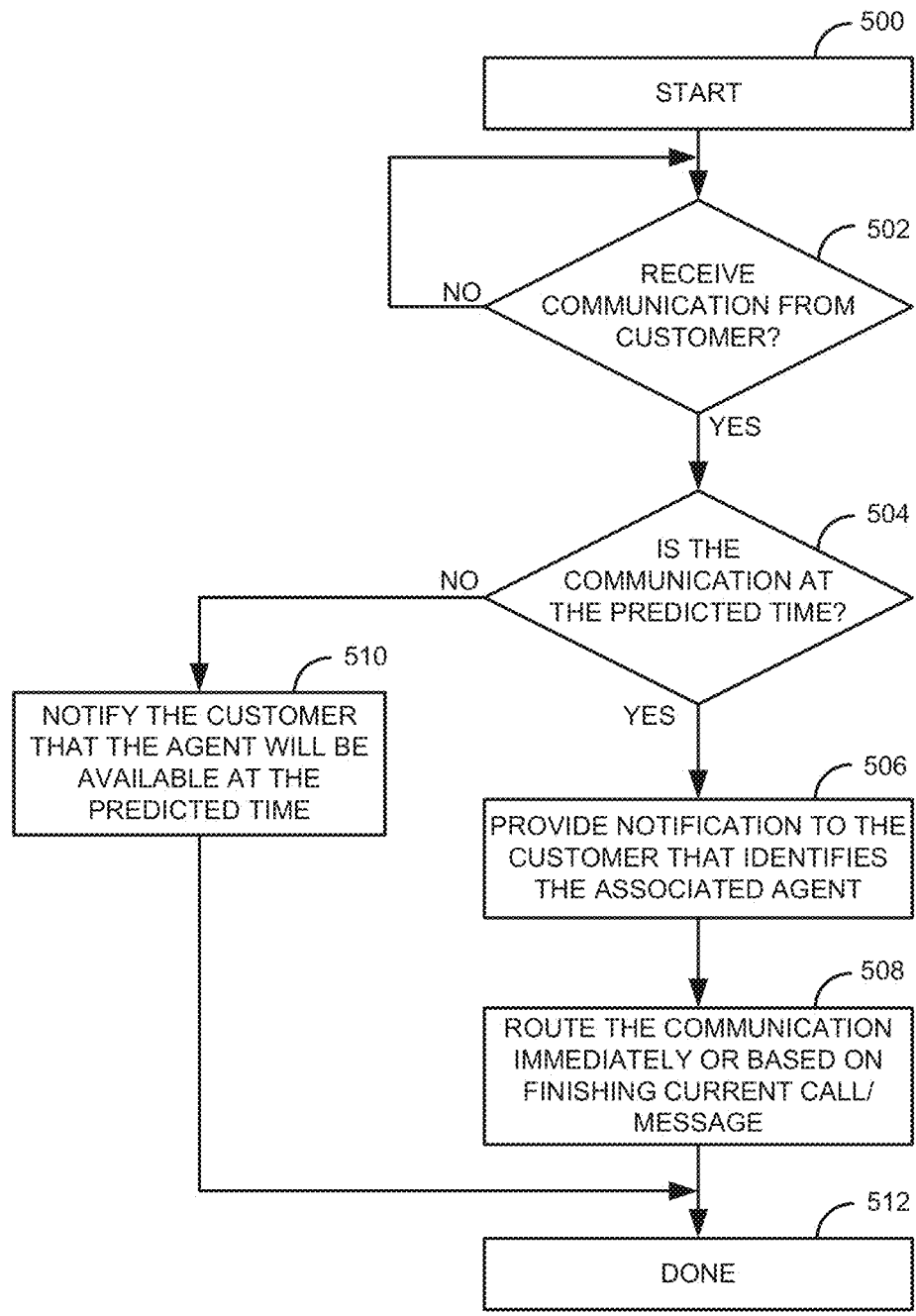
FIG. 5 is a flow diagram of a method for routing a communication to an associated agent.

FIG. 5 is a flow diagram of a method for routing a communication to an associated agent. The process starts in step 500.

Communication manager 121 determines if a communication has been received from the customer in step 502. If no communication has been received from the customer in step 502, the process repeats step 502. Otherwise, if communication manager 121 determines in step 502 that a communication has been received from the customer, communication manager 121 determines in step 504 if the communication is at the predicted time. If the communication is not at the predicted time in step 504, the customer is notified 510 via notification system 228 that the associated agent will be available at the predicted time and the process is done in step 512. The customer can be notified in various ways, such as via IRV system 228, an email, an Instant Message (IM), a text message, a video message, and the like.

Otherwise, if the communication is at the predicted time in step 504, a notification can be provided 506 to the customer that identifies the associated agent. For example, if the communication is an email, an email can be sent to the customer indicating that the customer's email is being sent to the associated agent. Alternatively, if the communication is a voice call, the notification can be provided to the customer by notification system 228 via an Interactive Voice Response (IVR) system. Communication manager 121 routes 508 the communication to the associated agent. The communication can be routed in various ways, such as immediately, based on finishing a current communication/call, by placing the communication at a specific point in a queue, and the like. The process is then done in step 512.

Figure 6:
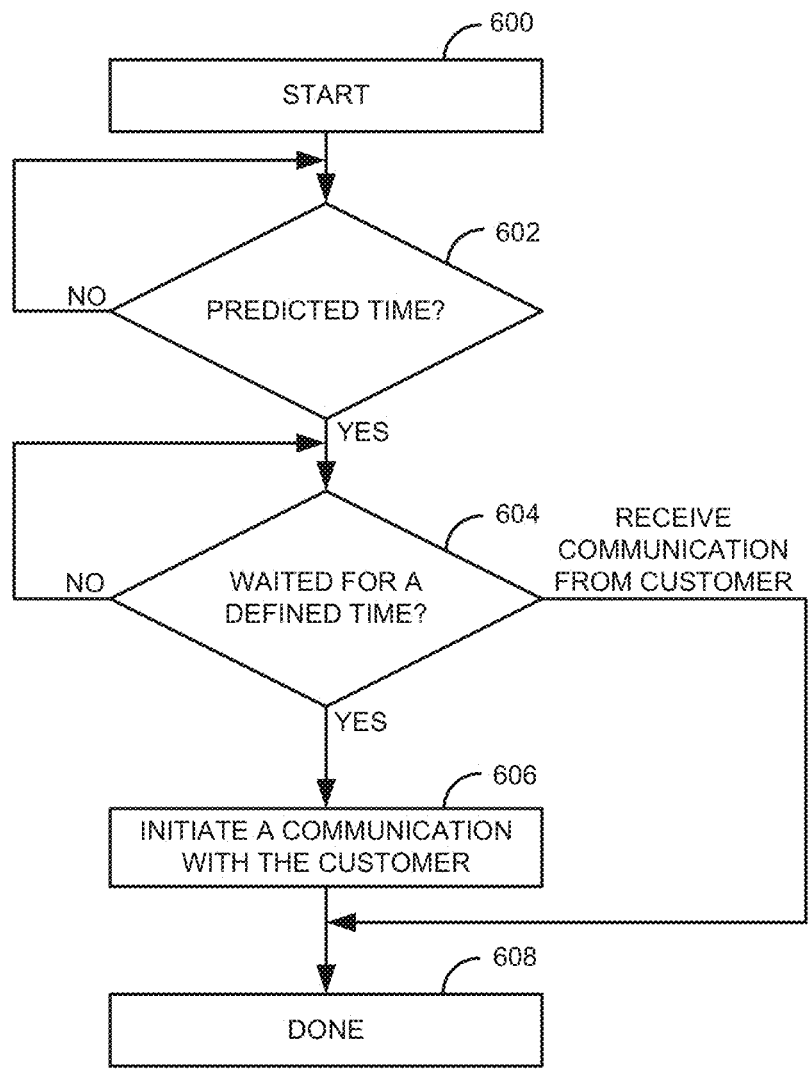
FIG. 6 is a flow diagram of a method for initiating a communication to a customer.

FIG. 6 is a flow diagram of a method for initiating a communication to a customer. The process starts in step 600. Communication manager 121 waits for the predicted time in step 602. If the predicted time is not reached in step 602, the process repeats step 602. Otherwise, if the predicted time is reached in step 602, communication manager 121 can optionally wait for a defined time in step 604. If the defined time has not been reached in step 604, the process repeats step 604. If a communication from the customer is received before reaching the defined time in step 604, the process is done 608. Otherwise, if the defined time has been reached in step 604, communication manager initiates 606 a communication with the customer at or during the predicted time. The process is then done in step 606.

To further illustrate, assume that the predicted time is from 6:00 P.M. to 8:00 P.M. on Thursday July $2^{nd}$ and the defined time is 1 hour. Upon reaching the predicted time in step 602, communication manager 121 waits in step 604 for 1 hour (until 7:00 P.M. on Thursday July $2^{nd}$) unless a communication is received from the customer. If a communication is received from the customer, the process is done 608. Upon reaching 7:00 P.M. on Thursday July $2^{nd}$ (assuming that the customer has not made a communication to contact center 120), communication manager 121 initiates 606 a communication with the customer from the associated agent. An example of initiating a communication with the customer could be where the associated agent is presented with an email screen for sending an email communication to the customer.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably. Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing a contact center comprising:
    getting a history of one or more communications from a customer, wherein the one or more communications include a context;
    determining a pattern from the history of the one or more communications from the context;
    predicting a time that the customer will initiate communication with the contact center based on the pattern; and
    scheduling an agent associated with the customer at the predicted time.

2. The method of claim 1, wherein predicting the time is based on a schedule of one or more future events.

3. The method of claim 1, further comprising the steps of:
    determining a potential load on the associated agent based on a predicted load on the contact center at the predicted time; and
    adjusting the potential load on the associated agent at or near the predicted time.

4. The method of claim 1, further comprising the step of notifying the associated agent of the predicted time that the customer will communicate.

5. The method of claim 1, further comprising the steps of:
    determining if a communication from the customer is at the predicted time; and
    responsive to the communication from the customer being at the predicted time, routing the communication from the customer to the associated agent.

6. The method of claim 5, wherein the communication from the customer is an audio call and further comprising the step of providing a notification to the customer that identifies the associated agent to the customer.

7. The method of claim 1, further comprising the steps of:
    receiving a communication from the customer that is outside the predicted time; and
    notifying the customer that the associated agent will be available at the predicted time.

8. The method of claim 1, wherein the context comprises a communication reason and a time of the communication.

9. The method of claim 1, further comprising the steps of:
    waiting for the predicted time to be reached; and
    responsive to reaching the predicted time, initiating a communication with the customer at or during the predicted time.

10. The method of claim 9, further comprising the steps of:
    waiting to reach a defined time within the predicted time;
    determining if the customer has made a communication to the contact center during the defined time within the predicted time; and responsive to the customer not making a communication to the contact center during the defined time within the predicted time and reaching the defined time, initiating the communication with the customer.

11. The method of claim 1, wherein determining the pattern from the history of the one or more communications from the context is determined from a pattern of postings on a social network in relation to the history of the one or more communications from the customer.

12. A system for managing a contact center comprising:
a communication manager configured to get a history of one or more communications from a customer, wherein the one or more communications include a context;
a pattern detector configured to determine a pattern from the history of the one or more communications from the context; and
a scheduler configured to predict a time that the customer will initiate communication with the contact center based on the pattern and schedule an agent associated with the customer at the predicted time.

13. The system of claim 12, wherein predicting the time is based on a schedule of one or more future events.

14. The system of claim 12, further comprising a load manager configured to:
determine a potential load on the associated agent based on a predicted load on the contact center at the predicted time, and
adjust the potential load on the associated agent at or near the predicted time.

15. The system of claim 12, further comprising a notification system configured to notify the associated agent of the predicted time that the customer will communicate.

16. The system of claim 12, wherein the communication manager is further configured to:
determine if a communication from the customer is at the predicted time; and
responsive to the communication from the customer being at the predicted time, route the communication from the customer to the associated agent.

17. The system of claim 16, further comprising a notification system configured to provide a notification to the customer that identifies the associated agent to the customer.

18. The system of claim 12, wherein the communication manager is further configured to receive a communication from the customer that is outside the predicted time and a notification system configured to notify the customer that the associated agent will be available at the predicted time.

19. The system of claim 12, wherein the context comprises a communication reason and a time of the communication.

20. The system of claim 12, wherein the communication manager is further configured to wait for the predicted time to be reached and responsive to reaching the predicted time, initiate a communication with the customer at or during the predicted time.

21. The system of claim 20, wherein the communication manager is further configured to:
wait to reach a defined time within the predicted time,
determine if the customer has made a communication to the contact center during the defined time within the predicted time, and
responsive to the customer not making a communication to the contact center during the defined time within the predicted time and reaching the defined time, initiate the communication with the customer.

22. The system of claim 12, wherein determining the pattern from the history of the one or more communications from the context is determined from a pattern of postings on a social network in relation to the history of the one or more communications from the customer.

* * * * *